United States Patent Office 2,796,378
Patented June 18, 1957

2,796,378

METHIONINE FREE REACTION PRODUCT OF A WATER-SOLUBLE COPPER SALT AND LACTALBUMIN HYDROLYSATE AS FUNGICIDE

Edgar A. Ferguson, Jr., Brooklyn, N. Y.

No Drawing. Continuation of application Serial No. 240,787, August 7, 1951. This application April 9, 1954, Serial No. 422,269

6 Claims. (Cl. 167—58)

This invention relates to a new and improved therapeutic agent for local topical application in the treatment of trichophytic or tineal infections, more commonly referred to as athlete's foot, and is more particularly concerned with the production of a therapeutically active but non-skin-irritating copper fungicide having utility and enhanced fungicidal action in the foregoing field of therapy.

Ordinary therapeutically active fungicidal agents are, for the most part, protoplasmic poisons and these protoplasmic poisons kill skin tissues. Indeed, the efficacy of most fungicidal agents of this character actually depends upon their tissue killing powers. Of the usual fungicides employed for the purpose under consideration, copper-containing agents are widely used because their protoplasmic poisoning power is not too strong and because they are quite selective in their activity against Trichophyton fungi. However, to attain any sort of fungicidal action from copper one must employ copper salts, and the salts commonly employed for this purpose are, among others, copper sulphate and copper acetate. Now, when these salts are employed they break down on the skin and an irritating acid is formed.

It is therefore the prime object of the invention to provide a copper fungicide which is not only therapeutically effective in combatting trichophytic or tineal infections, but which prevents simultaneous irritation of the skin and actually soothes the infected areas. Stated differently, the invention seeks to provide a therapeutic agent in the form of a new copper salt which will afford maximum copper fungicidal action, but a minimum of skin irritation because the acids formed during administration are not only non-irritating but are actually soothing.

In accordance with the present invention, it has now been discovered that a water-soluble copper salt of a particular mixture of amino acids and polypeptides may be provided which, when brought into contact with infected areas, not only kills the fungus but simultaneously soothes and heals the skin. The discovery of this principle has made it possible to provide a new copper fungicide for the treatment of trichophytic or tineal infections.

It has been determined, further in accordance with the invention, that the usual combination of so-called essential amino acids found in conventional protein hydrolysates is not satisfactory for this purpose. This usual amino acid mixture, which is the result of enzymatic digestion or acid digestion of milk protein or milk casein or yeast proteins, contains arginine, histidine, lysine, tyrosine, tryptophane, phenylalanine, cystine, methionine, threonine, leucine, isoleucine, and valine.

A study of these amino acids separately has shown that some are partly beneficial, some are indifferent in their effect, and some irritate as far as the skin is concerned; but none alone is completely satisfactory as the acid radical of the copper salt. A study made of the effect of a poultice of each of these separate amino acids on the skin has revealed the following:

| Amino acid: | Effect |
|---|---|
| Arginine | Indifferent. |
| Histidine | Slight irritation. |
| Lysine | Indifferent. |
| Tyrosine | Indifferent. |
| Tryptophane | Slightly beneficial. |
| Phenylalanine | Slightly beneficial. |
| Cystine | Slight irritating. |
| Methionine | Strongly irritating. |
| Threonine | Indifferent. |
| Leucine | Slightly beneficial. |
| Isoleucine | Indifferent. |
| Valine | Slightly beneficial. |

The discovery that certain of the amino acids in the combination caused irritation, led to the formation of a novel complex from which significant amounts of methionine, cystine and histidine, together with certain water-insoluble components, have been removed. A water-soluble copper salt of this novel complex, containing a particular amino acid mixture, along with polypeptides and unreacted proteins, is the basis of the present invention and the essential ingredient of final therapeutic agent.

The new fungicide for local application in the treatment of trichophytic or tineal infections comprises the water-soluble copper salt of a specifically prepared protein digest containing a particular mixture of amino acids and polypeptides, and is prepared by subjecting a protein such as lactalbumin to conventional hydrolysis, treating the hydrolysate in a special way to remove undesirable amino acids and some of the more water-insoluble fractions of the digested protein, further digesting and dehydrating by heat, dissolving the specially treated hydrolysate in water, adding a water-soluble copper salt and recovering the resulting water-soluble reaction product of the hydrolysate and the added copper salt.

While the new fungicide is herein conveniently referred to as a water-soluble copper "salt," it is understood, of course, that this new "salt" is, technically speaking, actually a mixture of water-soluble copper salts of the amino acids present in the specially treated hydrolysate, along with some water-soluble copper derivatives of polypeptides.

The lactalbumin used consists of plain untreated lactalbumin derived from milk. The analysis of the lactalbumin used for the majority of the tests was as follows: protein 82.5%, ash 8.2%, moisture 2.6%, the remainder consisting of certain carbohydrate materials which are eliminated by filtration during the process of hydrolysis.

The initial step in the process consists in the formation of lactalbumin hydrolysate, in a conventional manner, by enzymatic digestion with pork pancreas. The menstruum for digestion consists of a 10% solution of one normal hydrochloric acid. About 1% of comminuted pork pancreas is added to this solution together with about 10% of lactalbumin. This is placed in a water bath and maintained at a temperature of 52° C. for a period of 2½ hours with constant agitation. At the end of this time filtration will remove the solid particles and the remainder is spray dried to form a flaky powder of enzyme digested hydrolysate. This initial lactalbumin hydrolysate is a mixture of amino acids and polypeptides along with some protein elements which are undigested. These are expressed by the difference between the total nitrogen content and the amino nitrogen content minus the polypeptide constant (approximately 2.5%). The chemical composition is as follows:

| | Percent |
|---|---|
| Total nitrogen | 11.5 |
| Amino nitrogen | 7.5 |
| Ash | 4 |
| Moisture | 4 |

The amino acid content of the amino nitrogen is as follows:

| | Percent |
|---|---|
| Arginine | 3.5 |
| Histidine | 2 |
| Lysine | 8 |
| Tyrosine | 5.3 |
| Tryptophane | 2.3 |
| Phenylalanine | 5.6 |
| Cystine | 3 |
| Methionine | 2.8 |
| Serino | 4.9 |
| Threonine | 5.3 |
| Leucine | 15 |
| Valine | 4 |
| Alanine | 1 |

It should be understood that other methods of hydrolysis will yield a mixture of substantially the same analysis when applied to lactalbumin. One such method, as an alternative, is the application of heat to an aqueous acid solution of the lactalbumin. For instance 100 grams of lactalbumin may be added to 200 cc. of water containing 20 cc. of 12 normal hydrocloric acid. The solution is boiled in a reflux condenser for approximately 2 hours. At the end of that time the excess acid is neutralized with sodium hydroxide. The hydrolysate is dried and powdered.

Other proteins will yield products of similar analysis but not the same. For instance, the hydrolysis of yeast protein by enzyme yields a product higher in methionine. This is undersirable if the hydrolysate were employed per se because the amount of methionine must be reduced to a very low point before irritation caused thereby is eliminated. However, since all traces of methionine are removed when the copper salt is prepared in the final stage of preparation, as will be pointed out more specifically hereinafter, enzymatic yeast hydrolysis may be employed.

The water solubility of the lactalbumin hydrolysate and polypeptides described above is determined. A solution is then prepared so that all but 10% of the lactalbumin hydrolysate and polypeptides dissolve at room temperature. The range of this solution is from 3.25 to 3.75 grams in 11 cc. of water. The average amount is 3.5 grams in 11 cc. of water. The solution is allowed to stand at room temperature for 4 hours, after which it is stored overnight at a temperature of 50° F. and then decanted. Finally, the solution is filtered on a Buchner funnel with suction. It is at this point that the bulk of the methionine crystals and some of the more water-insoluble fractions of the enzymatic digested proteins have been removed.

The resulting clear filtrate is subjected to further hydrolysis by boiling down in a flat pan over a Bunsen flame to near dryness. The boiling process is carried on at temperature of 100° C. and must be continued for at least 3 hours in order to convert all of the remaining protein residues to polypeptides and amino acids. The final mixture has been shown to be deficient in methionine content, the original 2.8% having been reduced to less than 0.8%. The process lowers the quantity of histidine to approximately 1%, the amount of cystine to approximately 1% and reduces the total amount of unchanged protein substances to a negligible quantity while increasing the polypeptides to at least 3.5%. The amounts of amino acids present after treatment are approximately as follows:

| | Percent |
|---|---|
| Arginine | 3.5 |
| Histidine | 1 |
| Lysine | 8 |
| Tyrosine | 5 |
| Tryptophane | 2.3 |
| Phenylalanine | 5.6 |
| Cystine | 1 |
| Methionine | 0.6 |
| Serine | 4.9 |
| Threonine | 5.0 |
| Leucine | 15 |
| Valine | 4 |
| Alanine | 0.1 |

The percentage range of most of these constituents may be varied considerably (50% to 100%) without seriously interfering with the efficiency of the mixture. However, it is desirable to keep methionine as low as possible, between 0.4 and 0.8%. It is also desirable to keep the percentage of histidine below 1%, and the amount of cystine below 1 or 2%. In the final mixture the total nitrogen remains the same, being approximately 11.5%. The amount of amino nitrogen is increased to approximately 8% while the amount of organized protein revealed by Folin's reagent is reduced to less than 1%, demonstrating that the 4% difference between total nitrogen and amino nitrogen is not occupied any longer by organized protein but by additional polypeptides by reason of the boiling process.

The copper salt of the foregoing amino acid mixture may be prepared in either of two alternative processes.

In the first process, approximately 50 grams of specially treated lactalbumin hydrolysate, prepared as aforesaid, were placed in a beaker and enough water was added to dissolve the hydrolytic products without producing too bulky a volume (approximately 60 cc. of water suffices). The mixture is stirred until as much of the hydrolysate dissolves as possible, and then filtered. The clear solution is placed in a 500 cc. round bottom flask and to this solution is added 2 grams of copper carbonate C. P. The flask is connected to a reflux condenser, then gently heated and stirred. Overheating should be avoided and stirring should be consistent. The reaction proceeds with no difficulty and this is evidenced by the evolution of $CO_2$ from the mixture. The copper carbonate which is somewhat aquamarine in color dissolves gradually at the $CO_2$ is evolved and imparts to the solution a dark green coloration. The solution remains perfectly clear after reaction. This observation is extremely important in that it shows 100% reaction and more important proves the absence of several amino acids. The total volume of the end solution measured 114 cc., which was then reduced to a heavy sludge over a low flame.

In the second, and preferred process, 50 grams of the special hydrolysate are dissolved in sufficient water to make fluid. This usually amounts to 50–60 cc. This is filtered, the filtrate heated to approximately 150° F. and 1 gram of copper carbonate is added at a time to the heated filtrate. The mixture is shaken until all bubbles are eliminated and until a total of 10 grams are added. This is allowed to settle and then the liquor poured off and reduced to a heavy sludge over a low flame.

In both of the foregoing processes, other copper salts, such as copper nitride, copper nitrite and copper sulfite, may be employed to react with the special hydrolysate just so long as the liberated irritating acids formed during the reaction are neutralized and removed. Copper carbonate is preferred because gaseous $CO_2$ is liberated.

When proper filtration has been employed the following amino acids which are insoluble as copper salts will be absent in the final, water-soluble reaction products:

> Methionine
> Phenylalanine
> Leucine

The following are soluble as copper salts and are retained in the reactive product:

| | |
|---|---|
| Alanine | Lysine |
| Tyrosine | Tryptophane |
| Arginine | Cystine |
| Histidine | Serine |
| Valine | Threonine |

It is important to observe that, in preparing the copper salt of the present invention, the skin-irritating methionine is entirely removed.

The copper salt obtained from either of the foregoing alternative processes is then incorporated into an inert vehicle base to form the final ointment. Any convenient ointment vehicle may be employed, such as petrolatum, carbowax, mineral oil, olive oil, purified lard, stearic acid and stearates, waxes, wool fat, etc. or various mixtures thereof, so long as the ointment vehicle does not irritate the skin and does not itself support the fungus. If the latter is true, a separate fungicide must be added to prevent dilution of the active ingredients. The salt is present in the vehicle in amounts of 5–15% and preferably 10%. Carbowax has been found to be particularly useful. This is a material which is bland, odorless, and solid with a consistency of low melting petrolatum. The white grade is used for cosmetic and pharmaceutical use. The product preferred is known as 1500, and is composed of equal parts of polyethyleneglycols with an average molecular weight of 300 and a saturated fatty acid ester of polyethyleneglycol with an average molecular weight of 1540. The mixture has an average molecular weight of approximately 1500. This product is characterized by a low melting point, chemical stability, solubility for many pharmaceuticals, inertness toward therapeutic agents, and inability to support mold growth. It is readily available from the Carbide & Chemicals Corporations. The foregoing Carbowax 1500 provides a comparatively hard ointment vehicle base. A medium variety can be prepared by utilizing ½ the above mixture plus ½ of polyethylene glycols with an average molecular weight of 600. A liquid variety may be made from polyethylene glycols with an average molecular weight of 600.

It may be found desirable to incorporate between 5 to 10% of petrolatum U. S. P. with each of the above formulas.

Also, a series of mineral oil bases may be made by utilizing petrolatum U. S. P. alone for the hard base, petrolatum U. S. P. plus 15% heavy Russian mineral oil for the medium base and a mixture of petrolatum U. S. P. plus 25% heavy Russian mineral oil for the very liquid type of base.

Still another series of formulas contains purified lard. This purified lard is deodorized by means of charcoal and preserved by ¼ of 1% tincture of benzoin, N. F. Various grades of lard may be used to achieve the heavy or light variety of base.

Another series of bases may be made with combinations of mineral oil and sodium stearate. A combination containing about 25% sodium stearate the rest heavy Russian mineral oil makes a suitable base when properly mixed and heated. Wax may be added in the form of stearic acid 40% for the hard variety, 25% for the soft variety, and 5% for liquid type.

The official ointments contain white petrolatum, yellow wax or white wax the proportion of which may be varied to maintain a suitable consistence under different climatic conditions. A typical formula for this type of ointment base is petrolatum 10%; white petrolatum 5%; white wax 15%; yellow wax 5% stearic acid q. s.

Ointments may be prepared in accordance with the official N. F. types from olive oil 5%; wool fat (adeps lanae, not hydrated) 40%; petrolatum 55%. When this type of ointment base is used the copper salt must be triturated with the olive oil in a glass mortar until perfectly smooth. The wool fat is then incorporated followed by the petrolatum. This is mixed thoroughly. The above formula gives a salve of uniform medium hardness at all temperatures. When the amount of olive oil is increased to 10% and the petrolatum to 65% with consequent decrease in wool fat a very soft ointment may be prepared. An ointment of medium hardness may be made of the same formula using hydrated wool fat.

In some instances, the ointment may be rather dark in color, in which case the following procedure may be employed: 100 grams of the salt in paste form is mixed with 8 grams of activated charcoal, and then, after filtration, incorporated into the ointment vehicle.

Excipients such as perfume may be added as desired, the only requirement being that the addition should not result in irritation to the skin or promote fungus growth.

Clinical results have been absolutely remarkable in the case of medium severity. Those which are most severe do not respond too well to any known medication. Even in the very severe cases, relief of itch was pronounced and persistence in the application of the ointment over a long period of time has resulted in improvement, which is far better than that found with other systems of treatment which involve tissue destruction.

This application is a continuation of my prior application, Serial No. 240,787, filed August 7, 1951, now abandoned.

I claim:

1. A new fungicide useful in local topical treatment of tricophytic infections which comprises the water-soluble reaction product of a water-soluble copper salt and lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of tricophytic infections, admixed with skin irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%, said reaction product being entirely free of the methionine radical.

2. A new fungicide useful in local topical treatment of tricophytic infections which comprises an inert ointment base carrying the water-soluble reaction product of a water-soluble copper salt and lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of tricophytic infections, admixed with skin-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%, said reaction product being entirely free of the methionine radical.

3. A new fungicide useful in local topical treatment of tricophytic infections which comprises an inert polyethylene glycol ointment base carrying the water-soluble reaction product of a water-soluble copper salt and lactalbumin which has been subjected to substantial hydrolysis to yield a hydrolysate initially containing organized protein and therapeutically effective amounts of a plurality of free, simple amino acids, including tryptophane, phenylalanine, leucine and valine, specific in their topical application to alleviate symptoms of tricophytic infections, admixed with skin-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%, said reaction product being entirely free of the methionine radical.

4. A new fungicide useful in local topical treatment of tricophytic infections which comprises an inert polyethylene glycol ointment base carrying 5%–15% of the water-soluble reaction product of a water-soluble copper salt and lactalbumin which has been subjected to substantial hydrolysis to yield a hydrolysate initially containing organized protein and therapeutically effective amounts of a plurality of free, simple amino acids, including tryptophane, phenylalanine, leucine ad valine, specific in their topical application to alleviate symptoms of tricophytic infections, admixed with skin-irritating amounts of methionine, histidine and cystine, said hydrolysate being subsequently heat-modified to decrease the organized protein content to less than 1%, and reduce said methionine content to the order of 0.4% to 0.8%, the histidine content to below 1% and the cystine content to below 2%, said reaction product being entirely free of the methionine radical.

5. A new fungicide useful in local topical treatment of tricophytic infections which comprises an inert ointment base carrying the water-soluble reaction product of a water-soluble copper salt and the lactalbumin hydrolysate of claim 1 whose amino acid content is approximately as follows:

| | Percent |
|---|---|
| Arginine | 3.5 |
| Histidine | 1 |
| Lysine | 8 |
| Tyrosine | 5 |
| Trypotphane | 2.3 |
| Phenylalanine | 5.6 |
| Cystine | 1 |
| Methionine | 0.6 |
| Serine | 4.9 |
| Threonine | 5.0 |
| Lucine | 15 |
| Valine | 4 |
| Alanine | 0.1 | said reaction product being entirely free of the methionine radical.

6. A new fungicide useful in local topical treatment of tricophytic infections which comprises an inert polyethylene glycol ointment carrying 5%–15% of the water-soluble reaction product of a water-soluble copper salt and the lactalbumin hydrolysate of claim 1 whose amino acid content is approximately as follows:

| | Percent |
|---|---|
| Arginine | 3.5 |
| Histidine | 1 |
| Lysine | 8 |
| Tyrosine | 5 |
| Tryptophane | 2.3 |
| Phenylalanine | 5.6 |
| Cystine | 1 |
| Methionine | 0.6 |
| Serine | 4.9 |
| Threonine | 5.0 |
| Leucine | 15 |
| Valine | 4 |
| Alanine | 0.1 | said reaction product being entirley free of the methionine radical.

References Cited in the file of this patent

UNITED STATES PATENTS 2,666,012    Ferguson _____ Jan. 12, 1954

OTHER REFERENCES

Rideal: Chemical Disinfection and Sterilization, London, 1921, page 276.

New and Nonofficial Remedies: A. M. A. Council on Pharm. and Chem., J. P. Lippincott, 1951, pp. 27–31.